J. WATERLOO.

GLASS CUTTING MACHINE.

APPLICATION FILED OCT. 27, 1919.

Reissued Jan. 6, 1920.

14,788

3 SHEETS—SHEET 1.

WITNESS

R. A. Balderson

INVENTOR

John Waterloo,
By Pakewell, Byrnes & Parmelee,
his Attys.

J. WATERLOO.

GLASS CUTTING MACHINE.

APPLICATION FILED OCT. 27, 1919.

Reissued Jan. 6, 1920.

14,788.

3 SHEETS—SHEET 2.

WITNESS

R. A. Balderson

INVENTOR

John Waterloo

By Pakewell, Byrnes & Sawyer his Attys

J. WATERLOO.

GLASS CUTTING MACHINE.

APPLICATION FILED OCT. 27, 1919.

Reissued Jan. 6, 1920.

14,788.

3 SHEETS—SHEET 3.

WITNESS

R. A. Balderson

INVENTOR

John Waterloo

By Pickwell, Byrnes & Parmelee his attys.

UNITED STATES PATENT OFFICE.

JOHN WATERLOO, OF NEW EAGLE, PENNSYLVANIA, ASSIGNOR TO WINDOW GLASS MACHINE COMPANY, OF PITTSBURGH, PENNSYLVANIA, A CORPORATION OF NEW JERSEY.

GLASS-CUTTING MACHINE.

14,788. Specification of Reissued Letters Patent. Reissued Jan. 6, 1920.

Original No. 1,259,688, dated March 19, 1918, Serial No. 169,879, filed May 21, 1917. Application for reissue filed October 27, 1919. Serial No. 333,840.

*To all whom it may concern:*

Be it known that I, JOHN WATERLOO, a citizen of the United States, residing at New Eagle, Washington county, Pennsylvania, have invented a new and useful Glass-Cutting Machine, of which the following is a full, clear, and exact description, reference being had to the accompanying drawings, forming part of this specification, in which—

Figure 1:
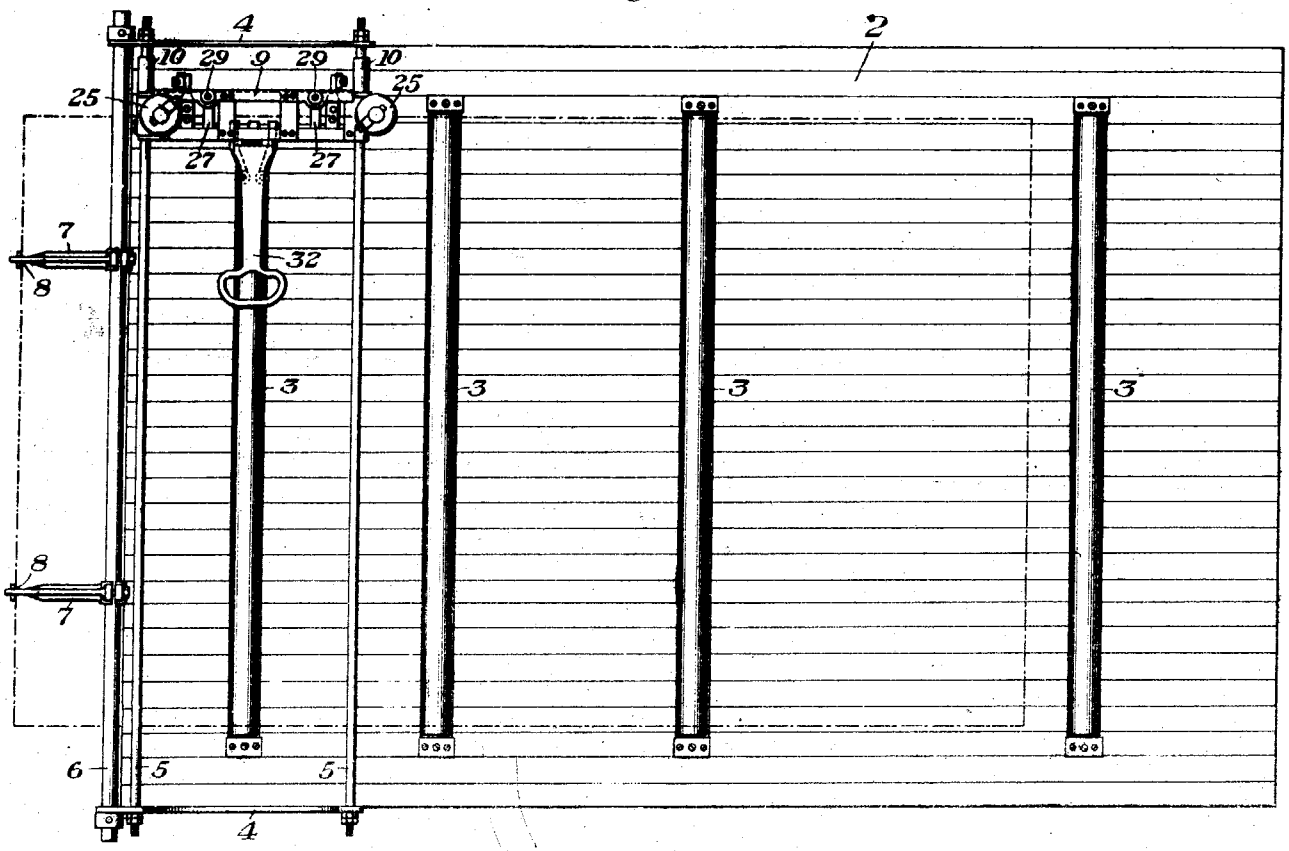
Figure 1 is a plan view of a glass cutting table having my cutting attachment applied thereto.
Figure 2:
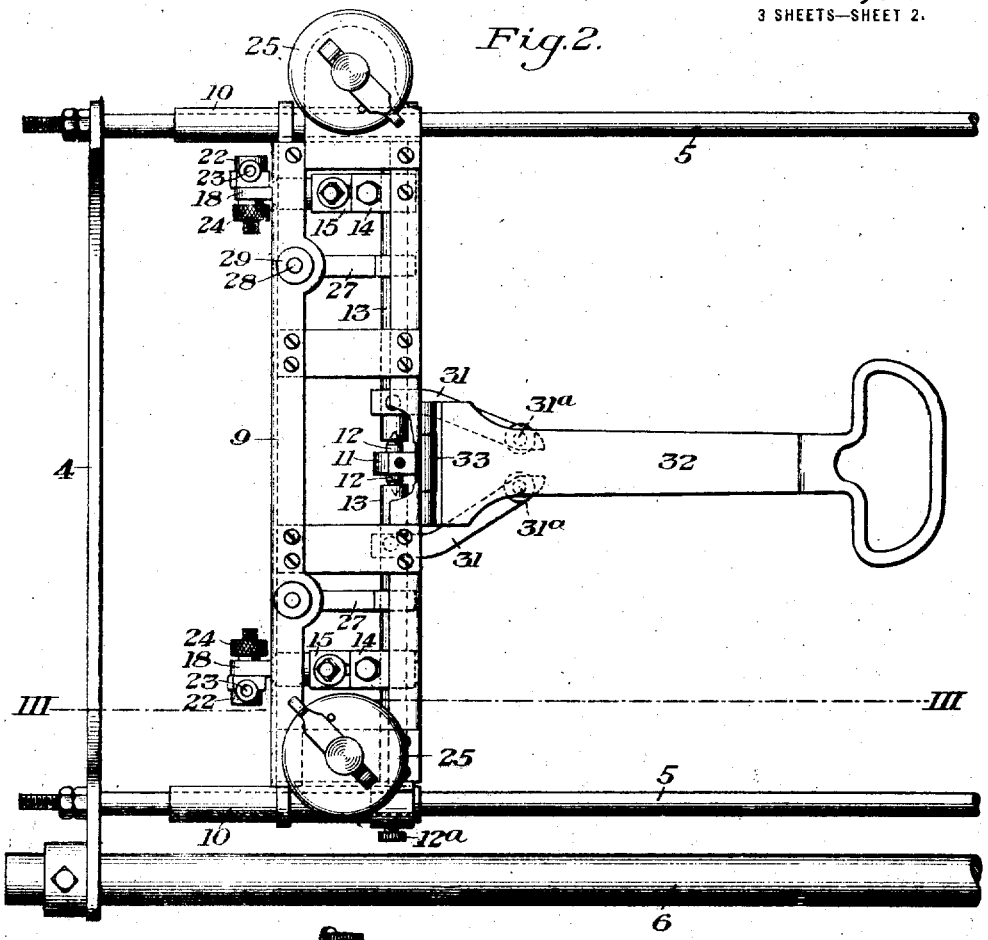
Fig. 2 is a plan view of a portion of the cutting attachment.

My invention has relation to glass cutting apparatus, and has been more particularly designed to provide an attachment for glass cutting tables by means of which glass sheets may be accurately and rapidly cut into strips of the desired width. My invention provides an attachment of this character which can be readily applied to a glass cutting table; which is simple in its construction and operation, and which provides means whereby a plurality of cuts may be simultaneously made.

The nature of the invention will be best understood by reference to the accompanying drawings in which I have shown a preferred embodiment of the invention, and which will now be described, it being premised, however, that various changes can be made in the details of constructions, arrangement and combination of the several parts without departing from the spirit and scope of my invention as defined in the appended claims.

In these drawings the numeral 2 designates a glass cutting table which may be of any usual or suitable character, and which may be provided with a plurality of transverse rollers 3 for facilitating movement of the glass sheets thereon.

Secured to the forward end portion of the table is a frame of a cutting attachment, this frame comprising the end plates 4, one at each side of the table, the two parallel connecting and transverse guide rods 5, and the rod or bar 6 which also connects the end plates 4 adjacent to the forward guide rod 5. The end plates 4 support the guide rods 5 above the surface of the table. 7 designates gage stops which are secured to the rod or bar 6.

Figure 5:
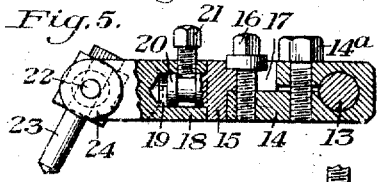
Fig. 5 is a section on the line V—V of Fig. 6.
Figure 6:
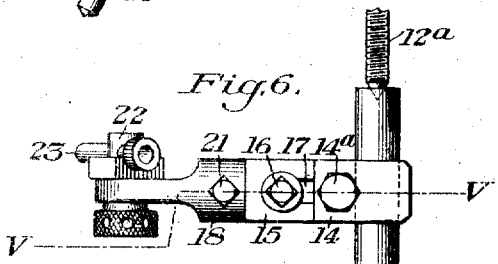
Fig. 6 is a plan view showing certain details of the cutter carrying parts.
Figure 6:
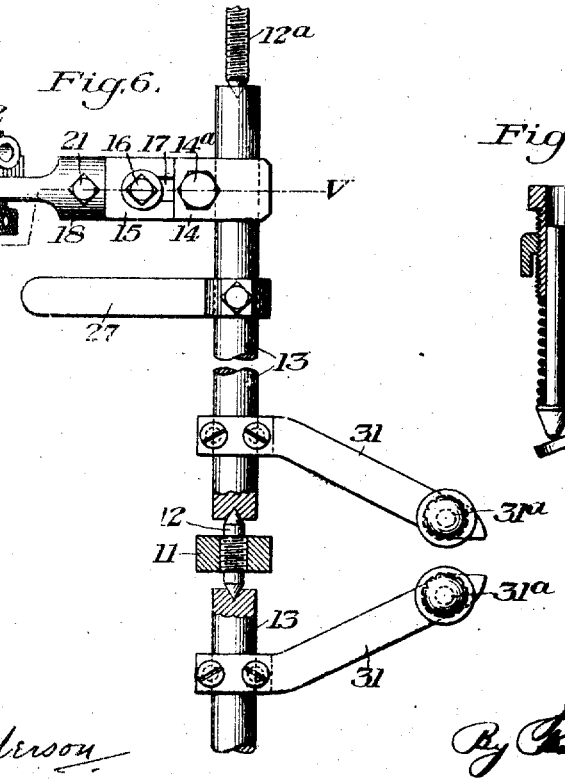

9 designates a frame which at each end portion carries an elongated sleeve 10 adapted to slide on one of the guide rods 5. This frame is provided with the depending lug portions 11 in which are mounted bearing pins or screws 12 (best shown in Fig. 6), and whose pointed ends form the bearings for the transverse cutter shafts 13. In the construction shown there are two of these shafts arranged end to end in axial alinement, each shaft having a bearing on one of the end screws or pins 12 at one end, and upon one of the center pins or screws $12^a$ at the opposite end. Adjustably clamped on each of the shafts 13 is a forwardly and downwardly extending cutter carrier. In the construction shown, each of these cutter carriers consists (see Figs. 5 and 6) of the clamping portion 14 carrying the clamping screw $14^a$; the intermediate member 15 secured to the member 14 by a clamping screw 16 seated in a slot 17; and the cutter holding member 18. The member 18 has a socket 19 in its rear end portion which rotatably engages a stud 20 carried by the member 15. The member 18 is secured in the proper adjustment by means of the clamping screws 21. Rotatably mounted in the forward end portion of the member 18 is a transverse pin or short shaft 22 having an opening therethrough for the tool 23. The rotatable pin or shaft 22 can be secured in the desired adjustment to give the proper angle to the tool by means of the clamp nut 24.

By the construction described, each tool carrying arm can be adjusted longitudinally of its shaft 13, and can be turned on said arm to vary its angular position. Each tool holding member 18 can be rotated on its stud 20; each tool shaft 22 can be rotated in its bearing; and each tool 23 can be adjusted vertically in its seat in the shaft 22. These adjustments provide for any desired accurate setting of the tools.

Furthermore, it will be noted that the members 15 and 18 form a detachable, universally adjustable self-containing unit. This unit can be placed on a testing machine, similar to the regular machine and all necessary adjustments made, after which it can be placed on the regular machine in a fixed position like that which it occupied on the testing machine.

25 designate oil cups which are mounted on the end portions of the frame 9, and each of which has a bottom delivery pipe 25ª carrying a wick 26 placed immediately in advance of the adjacent tool 23 for the purpose of conveying lubricant to the surface of the glass immediately in advance of the tool.

Figure 4:
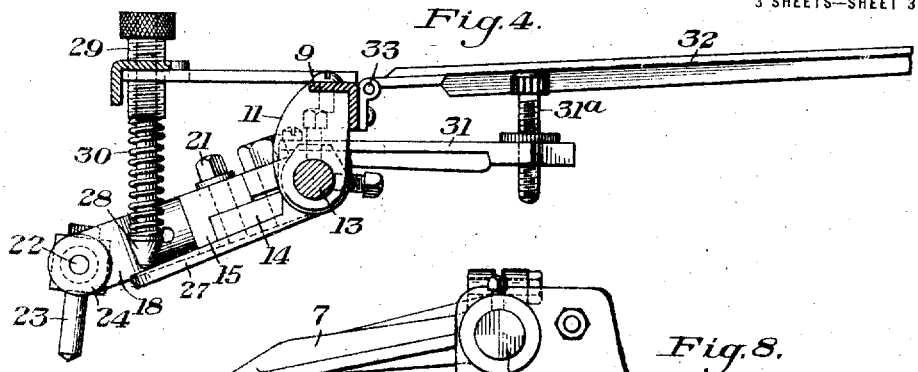
Fig. 4 is a view partly in vertical section and partly in side elevation of a portion of the attachment.
Figure 8:
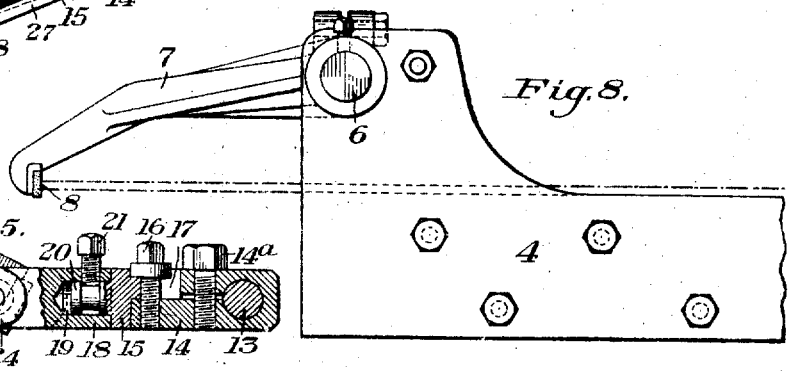
Fig. 8 is a detail view showing one of the gages in side elevation.
Figure 7:
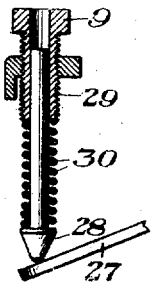
Fig. 7 is a detail view of one of the spring stops.

Rigidly secured to each shaft member 13 is a projecting arm 27, which is arranged to be engaged by a spring pressed pin 28 (best shown in Figs. 4 and 7). Each of these pins is seated in a sleeve nut 29 having a threaded bearing in the frame 9, the spring 30 being seated between the head portion of the pin 28 and the lower end of said sleeve nut. These spring pins exert the requisite amount of pressure upon the cutters during their cutting movements.

Rigidly connected to the inner end portion of each shaft 13 is a projecting arm 31. These two arms converge toward each other at their free ends, the latter being provided with the vertically adjustable stop screws 31ª. 32 is a hand operated lever arm hinged or pivoted to the frame 9 at 33, and which bears against the headed upper ends of the stop screws 31ª when in the position shown in Fig. 3.

Figure 3:
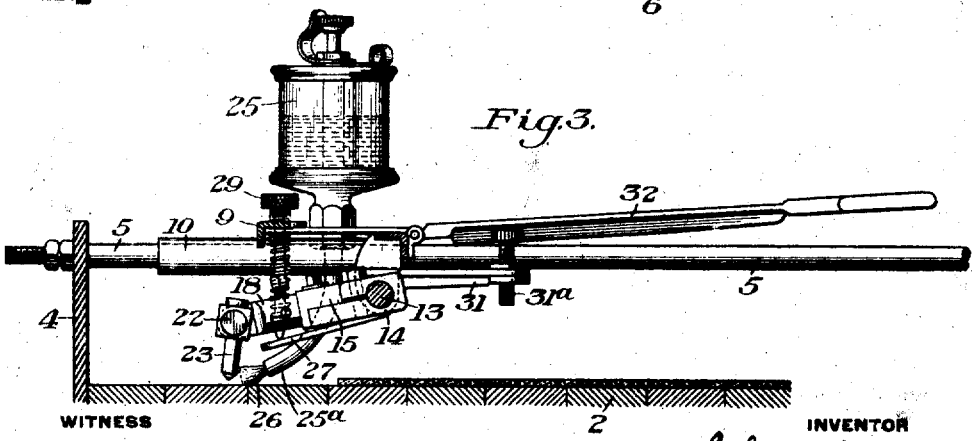
Fig. 3 is a section on the line III—III of Fig. 2.

The operation is as follows: The sheets to be cut in strips are placed upon the table 2, as indicated in Fig. 3 and are pushed forwardly under the cutters, thereby raising the latter somewhat and putting the springs 30 under slight tension. If necessary, at the first cut the leading edge of the sheet may be squared up on the table without reference to the stops 7. For subsequent cuts, the leading edge of the sheet is advanced until it engages the stop shoulder 8. The operator grasps the handle of the lever 32 and pulls the frame 9 (which with its sleeves 10 forms a carriage) across the width of the table, thereby making two cuts simultaneously and severing a complete strip at each operation. The strip is, of course, fed forwardly between successive cuts. In moving the carriage back to its initial position for a new cut, the lever 32 is depressed, thereby engaging the heads of the screws 31 and rocking the shafts 13 to lift the cutter carriers and cutters free of the surface of the table.

The advantages of my invention will be apparent to those skilled in the art, since it provides a simple, convenient and accurate strip cutter of the multiple cut type capable of being applied to existing tables.

I claim:

1. Glass cutting apparatus, comprising a cutting table, guides extending transversely over the table, a carriage movable transversely of the table on said guides, a plurality of cutter shafts journaled in said carriage in end to end alinement, a cutting tool carried by each of said shafts, means for imparting proper tension to the cutting tools during their cutting movement, and means for raising the tools, during the return movement of the carriage, substantially as described.

2. Glass cutting apparatus, comprising parallel guides, a carriage mounted for movement on said guides, a plurality of cutter shafts mounted on bearings on said carriage, a cutter carrier secured to each shaft, a cutting tool mounted in each cutter carrier, means for imparting tension to the cutters during the cutting movement of the carriage, and means for raising the cutter carriers and cutters during the return movement of the carriage, substantially as described.

3. Glass cutting apparatus, comprising a carriage, guides on which the carriage is mounted, a plurality of rocking cutter shafts mounted on said carriage, a cutter carrier mounted on each shaft, a cutter mounted on each cutter carrier, an independent tensioning device for each cutter, a lever member connected to the carriage for moving the same, and arms connected to said shafts and arranged to be engaged by the lever member to thereby rock the shafts and lift the cutter cariers and cutters during the return movement of the carriage, substantially as described.

4. Glass cutting apparatus, comprising a movable carriage, guiding means for the carriage, a plurality of rocking cutter shafts mounted on the carriage, an adjustable cutter carrier secured to each of said shafts, a cutting tool adjustably mounted on each carrier, means for independently tensioning each cutting tool, an actuating member connected to the carriage, and means whereby said actuating member may be operated to raise the cutter carriers and cutters during the return movement of the carriage, substantially as described.

5. Glass cutting apparatus, comprising a movable carriage, a plurality of cutter carriers mounted on said carriage, a cutter mounted in each cutter carrier, an actuating member connected to the carriage, and means whereby said actuating member may be operated to raise the cutter carriers and cutters out of cutting positions during the return movement of the carriage, substantially as described.

6. Glass cutting apparatus, comprising a carriage, a rocking cutter shaft mounted on bearings on said carriage, and a cutter carrier adjustably secured to the cutter shaft, said cutter carrier comprising an adjustable clamping member engaging the shaft, an intermediate member secured to the clamping member and having a journal portion, and a cutter carrier rotatably mounted on said journal portion and having a seat for a cutting tool, substantially as described.

7. Glass cutting apparatus, comprising a carriage, a rocking cutter shaft mounted on bearings on said carriage, and a cutter carrier adjustably secured to the cutter shaft, said cutter carrier comprising an adjustable clamping member engaging the shaft, an intermediate member secured to the clamping member and having a journal portion, and a cutter carrier rotatably mounted on said journal portion, a pin or shaft rotatably mounted in said holder, and a cutting tool seated in said pin or shaft, substantially as described.

8. Glass cutting apparatus, comprising a cutting tool, and a tool carrying arm, said arm having means whereby it may be detachably mounted on the apparatus, and also having means for obtaining a universal adjustment of the tool, substantially as described.

9. Glass cutting apparatus, comprising a cutting tool, and a tool carrying arm, said arm having means whereby it may be detachably mounted on the apparatus, and having members which are relatively adjustable in planes at an angle to each other, substantially as described.

10. Glass cutting apparatus, comprising a cutting tool, and a tool carrying arm, said arm having means whereby it may be detachably mounted on the apparatus in a fixed definite position, said arm being formed in two rotatably connected sections, one of said sections having a mounting for the tool rotatable in a plane at right angles to the plane of rotation of said section, substantially as described.

In testimony whereof, I have hereunto set my hand this 18th day of October, 1919.

JOHN WATERLOO.

Witnesses:

H. M. Corwin,

H. S. Wilson.